Nov. 24, 1953   N. E. DORLAND   2,660,319
APPARATUS FOR LOADING AND UNLOADING CARGO VESSELS
Filed Oct. 8, 1946   5 Sheets-Sheet 1
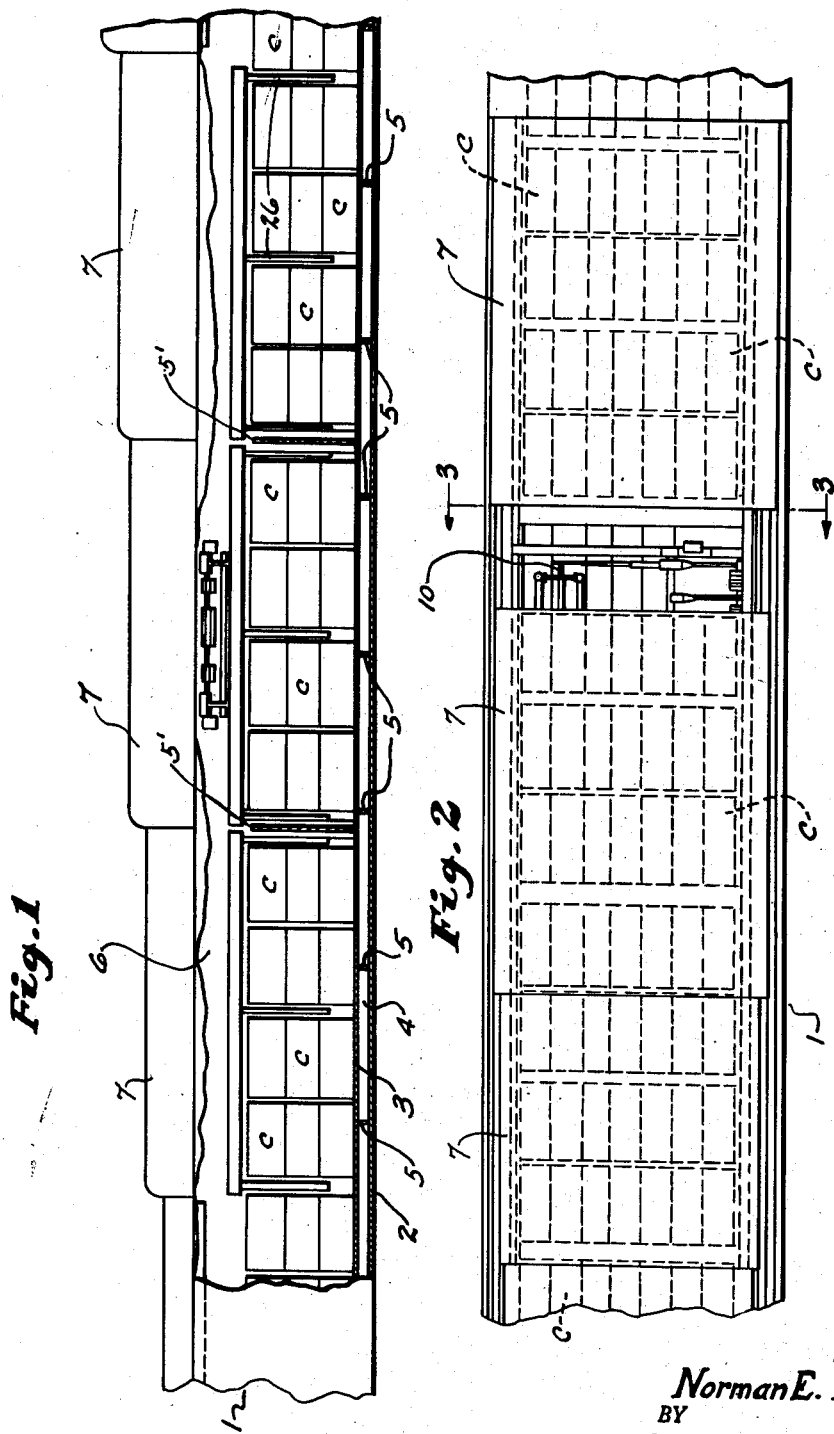
INVENTOR.
Norman E. Dorland
BY
Caesar and Rivise
Attorneys Nov. 24, 1953  N. E. DORLAND  2,660,319
APPARATUS FOR LOADING AND UNLOADING CARGO VESSELS
Filed Oct. 8, 1946  5 Sheets-Sheet 2
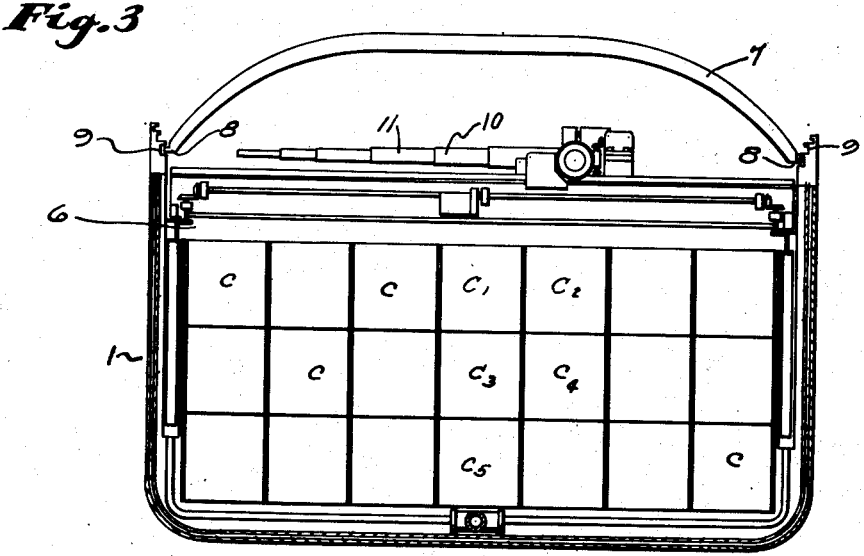
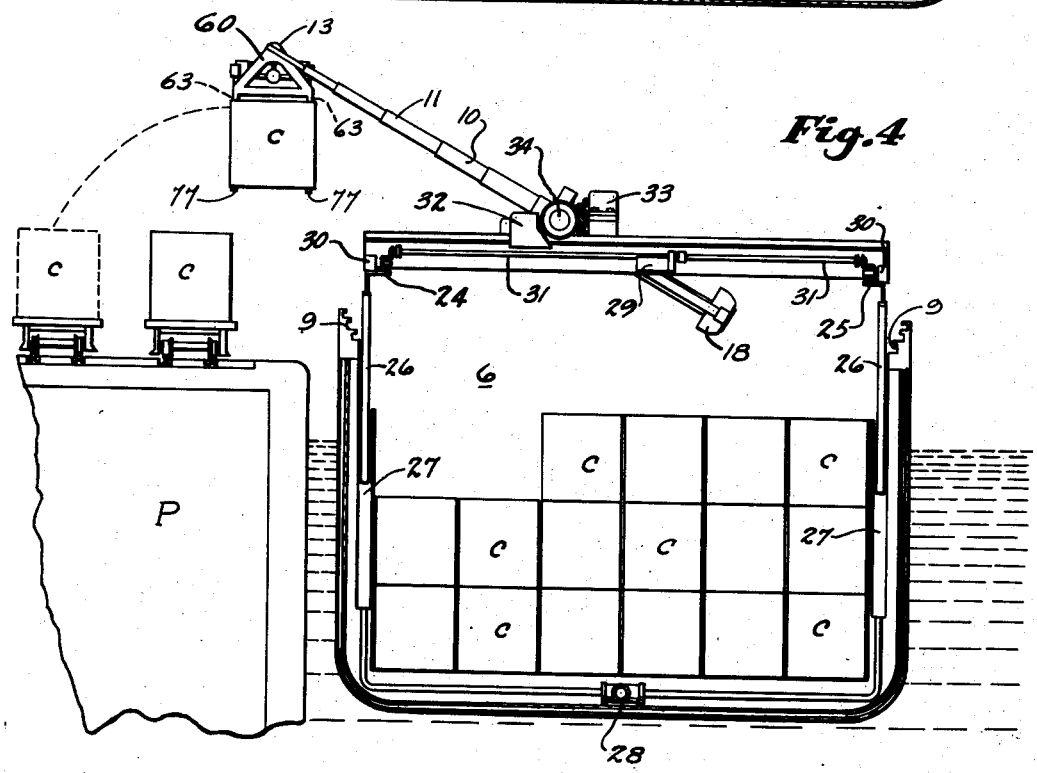
INVENTOR.
Norman E. Dorland
BY
Caesar and Rivise
Attorneys

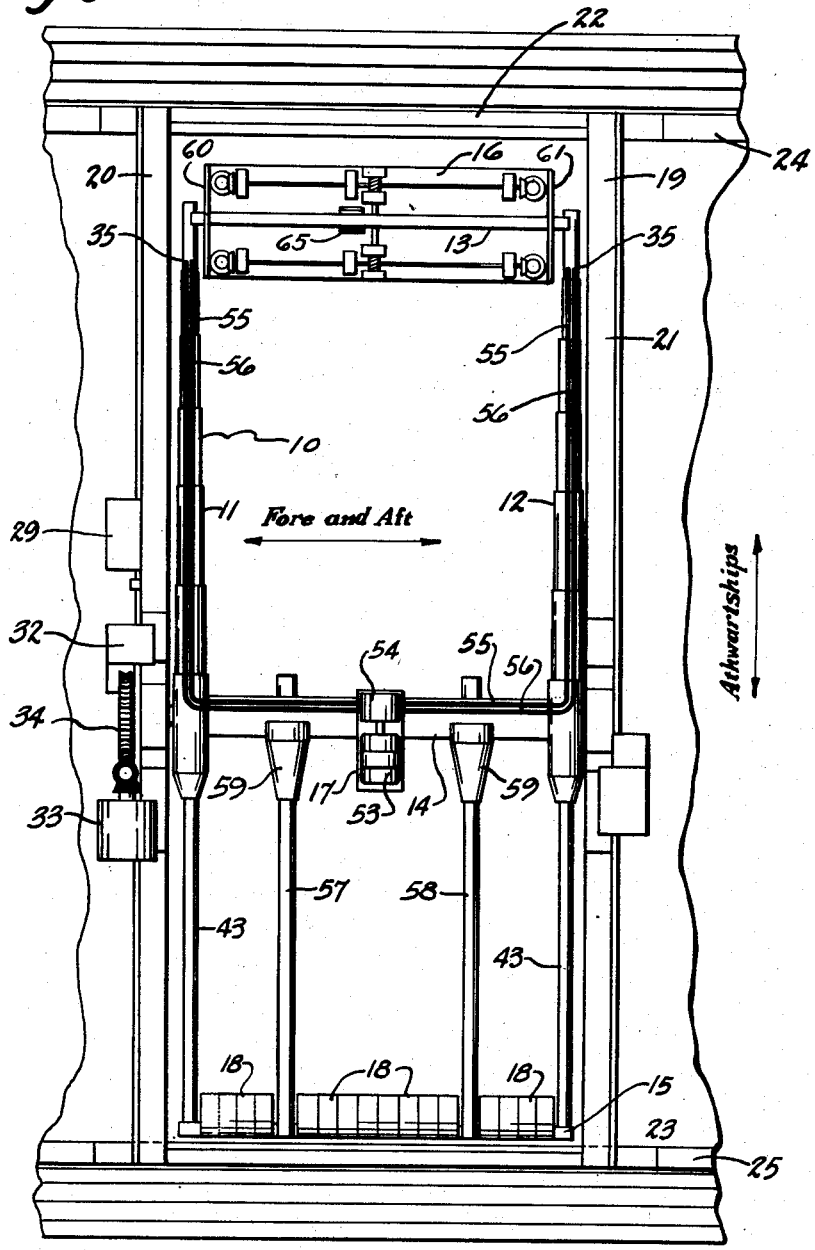

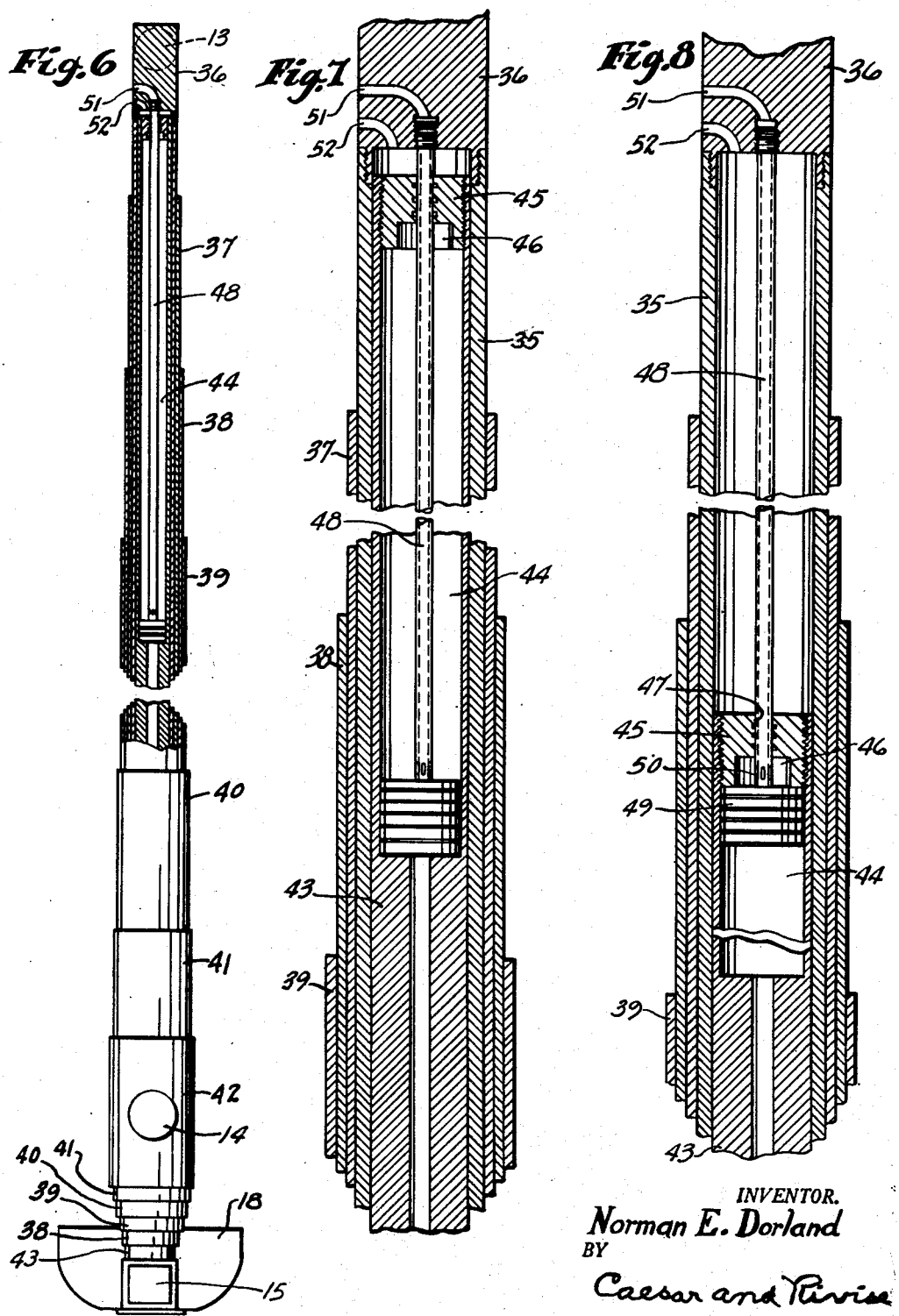

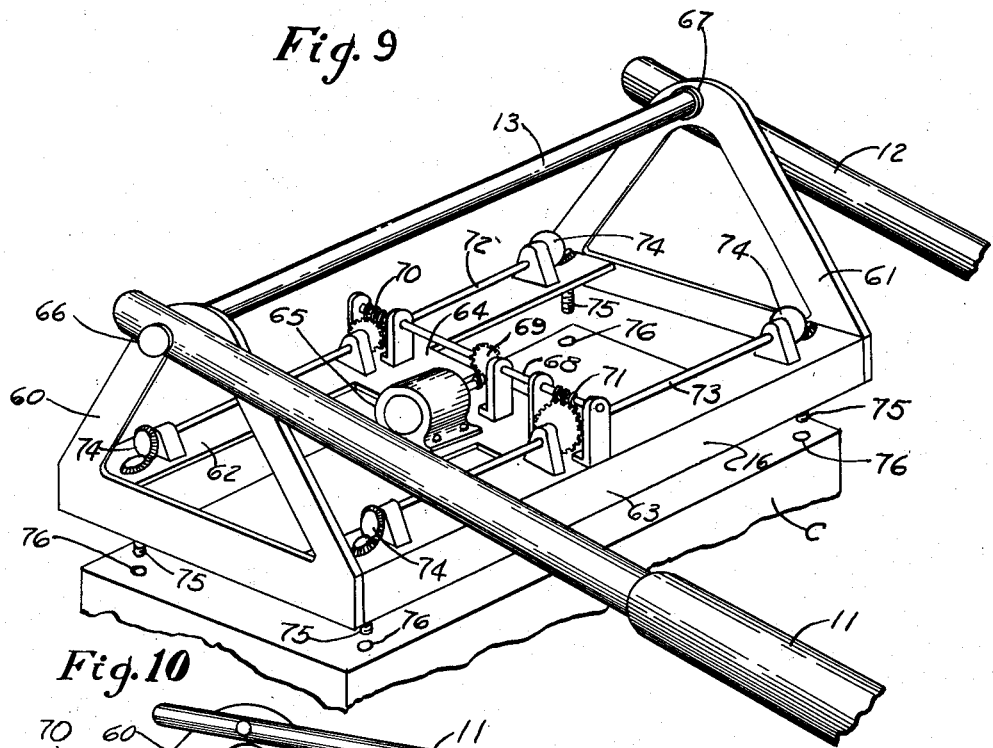

Patented Nov. 24, 1953

2,660,319

UNITED STATES PATENT OFFICE 2,660,319

APPARATUS FOR LOADING AND UNLOADING CARGO VESSELS

Norman E. Dorland, Kirkland, Wash.

Application October 8, 1946, Serial No. 702,014

1 Claim. (Cl. 214—15)

The invention of this application for patent is directed to apparatus for loading and unloading cargo vessels.

The primary object of the invention is to provide a radically new type of apparatus for loading and unloading cargo vessels.

Another important object is to provide an apparatus for loading and unloading cargo vessels with a minimum of time and labor.

Another object of importance is to provide a new and greatly improved form of cargo vessel particularly well adapted to be fitted with the loading and unloading apparatus of the invention.

Another important object is to provide a novel form of cargo container, particularly adapted for use with the vessel and with the loading and unloading apparatus of the invention.

Referring briefly to the drawings wherein is illustrated the presently preferred embodiment of the invention:

Figure 1 is a side elevation of the midsection of a ship, partly broken away to reveal stowing of the cargo;

Figure 2 is a plan view of the portion shown in Figure 1;

Figure 3 is a section taken on line 3—3 of Figure 2;

Figure 4 is a cross-section on substantially the same plane as Figure 3, and showing cargo being transferred from ship to shore, or vice versa;

Figure 5 is a plan view of the loading mechanism;

Figure 6 is a side elevation on a larger scale of either of the side members of the boom structure, with a portion omitted and with a portion in cross-section;

Figure 7 is a cross-section of the forward portion of the boom member of Figure 6 with a part omitted and showing the relative location of the internal elements when the counterweights are retracted;

Figure 8 is a cross-section substantially the same as Figure 7, but showing the relative location of the internal elements when the counterweights are etxended;

Figure 9 is a perspective view of the presently preferred construction of cargo lifting mechanism, showing a portion of one of the cargo containers;

Figure 10 is a side elevation, partly broken away, of the lifting mechanism engaging one of the cargo containers, and Figure 11 is a view of a detail of the cargo container.

Reference will now be had to Figures 1 and 2, wherein is shown the preferred structure of ship to be used in practicing the invention. The ship, which is constructed without the conventional superstructure, preferably has a double hull 1, the outer shell being denoted by 2 and the inner shell by 3. The space between the shells may advantageously be divided into water-tight compartments 4 by means of bulkheads 5. By means of the recited structure, there is obtained increased structural strength and safety, and it is possible to omit the conventional between decks. The conventional type of bulkhead, which extends to and supports the deck is eliminated. A number of partial bulkheads 5' extending from the bottom as shown in Figure 1 may be provided. Such bulkheads increase athwartship strength, and afford a measure of protection against flooding the entire hold, but they are not necessary, and in certain cases may be omitted, e. g. when a cargo of locomotives, lengthy rails, pipe, timber, etc., is to be loaded.

The fore and aft portions of the ship are not shown in the drawings. They may be of conventional or any desired construction, providing living quarters and space for power plant. The portion between the fore and aft constitutes a cargo hold 6, which may be divided by the short bulkheads into cargo spaces for the reception of the containers to be hereinafter described. If the short bulkheads are omitted, the space constitutes a single cargo hold for the reception of locomotives, etc. The cargo spaces between the short bulkheads are adapted to receive a predetermined number of cargo containers.

One of the important, though not indispensible, features of the ship is a hatch covering now to be described. This covering consists of a plurality of arched telescoping sections 7, each of which extends transversely of the ship as shown in Figure 3. The outer ends of the sections are provided with flanges 8, which are received in tracks 9 in the sides of the ship. Means (not shown) may be provided for moving the sections of the hatch covering. When fully extended fore and aft, the sections completely cover the area normally occupied by the deck of a conventional ship. Suitable means (not shown) may be provided to drain water from the top of the hatch covering and to seal the hatches against leakage.

The loading and unloading of the ship are accomplished by means of the boom structure 10. This structure consists essentially of two telescoping side members 11 and 12 of identical construction, which are connected by means of beams 13, 14 and 15. The beam 13 serves to support the cargo lifting mechanism 16; the beam 14 serves to support the motive power 17 for extending and retracting the side members of the boom; and the beam 15 supports the counterweights 18.

The boom structure 10 is pivotally supported on the rectangular frame 19, which consists of the side pieces 20 and 21 and the end pieces 22 and 23. This frame is movable fore and aft on rails 24 and 25. The boom structure is movable athwartships on the frame itself. The rails 24 and 25 are mounted on a plurality of hydraulic pistons 26, which are movable in cylinders 27, so that the entire boom structure may be raised or lowered at will. The cylinders and pistons are located along the inner sides of the ship and are commonly connected by means of suitable piping 28 so as to permit remote control.

Boom structure 10 may be moved fore and aft, as may be desired, by moving the frame 19 in the desired direction. As has been stated, the frame 19, which supports the boom structure, is movable fore and aft on rails 24 and 25. The movement is accomplished by means of the motor 29, which is operatively connected to the driving wheels 30 through a suitable form of transmission 31.

As has been stated, the boom structure 10 is movable athwartships on the frame 19. The sidepieces 20 and 21 serve as tracks for this movement. Said movement is effected through a suitable transmission powered by motor 32, which is mounted outboard of the boom structure.

Tilting motion of the boom structure is accomplished by means of motor 33, also mounted outboard of the boom structure, and operating through a gear transmission 34.

Each side member 11, 12 of the boom structure consists essentially of a hollow cylindrical tube 35 closed at its outer end by means of a cylindrical element 36. The tube is strengthened by means of a series of superimposed sleeves 37, 38, 39, 40, 41 and 42, which are arranged in stepped relationship, the greatest thickness being near the pivotal point of the boom structure. Slidably mounted within the tube 35 is a tube 43. The beam 15 is affixed to the outer end of the tube 43, and carries the counterweight 18. An hydraulic cylinder 44 is contained in the other end. The cylinder is closed by means of an end member or plug 45. The end member has a recess 46 on its inner face and is provided with a hole 47. Extending through the hole 47 and secured at one end to the element 36 is a pipe 48. Secured to the opposite end of the pipe is a stationary piston 49, which is contained within cylinder 44. The pipe 48 is provided near the piston 49 with a series of apertures 50. The end element 36 is provided with two openings 51 and 52, the first of which communicates with the pipe 48, and the other communicates with the tube 35.

A liquid such as oil may be pumped selectively to either aperture 51 or 52 in order to extend or retract the tubes 43 of the two side members 11 and 12 of the boom structure, thereby moving the beam 15 carrying the counterweights 18 inwardly or outwardly as required. It will be understood that liquid entering the aperture 52 will exert pressure on the end member or plug 45, thereby forcing the tube 43 outwardly, and that liquid entering aperture 51 will pass through pipe 48 into recess 46 and exert pressure between the end member or plug 45 and stationary piston 49, thereby forcing the tube 43 inwardly. Numeral 17, as has been stated, denotes the motive power for this operation. This is a hydraulic unit consisting of an electric motor 53 and pump 54. Numerals 55 and 56 denote the pipe connections between the pump and elements 36 of the two end members of the boom structure.

Reference numerals 57 and 58 denote two members which may advantageously be provided between cross beams 14 and 15 to provide greater strength and rigidity to the boom structure 10. These members are guided through sleeves 59, which are secured to beam 14.

A conventional or other form of cargo lifting apparatus, such as an ordinary overhead electric hoist, may be provided at the outer ends of the telescoping members of the boom structure 10. I prefer to use the construction illustrated in Figure 9.

Referring to Figure 9, it will be seen that the cargo lifting mechanism 16 consists of the two end frames 60 and 61, which are shown as being of triangular form, and which are connected at their lower extremities by means of structural members 62 and 63. This framework is shown provided with a platform 64, which serves to strengthen it and to provide a mounting for the operating elements including a motor 65. Parts of the platform may be cut out as shown to reduce the weight. The frame-work just described is pivotally suspended from beam 13 of the boom structure on suitable bearings 66 and 67.

Reversible motor 65 is operatively connected to a shaft 68 through a worm and gear unit 69. Said shaft 68 has at its outermost extremities worm and gear units 70 and 71 to transmit rotational movement to shafts 72 and 73 respectively. At the outermost extremities of shafts 72 and 73 are identical mitre or bevel gear units 74 transmitting simultaneous rotational movement to lifting screws 75. Since all elements of the transmission are in permanent engagement, operation of said motor 65 rotates all four screws 75, and reversal of said motor 65 will reverse the rotational movement of all four screws 75.

A special construction of cargo container C is used in practicing the invention. This container is illustrated in detail in Figures 9, 10 and 11. The container C resembles any other cargo containers or box but is provided with four sockets 76 in the lid thereof, so disposed that their centers coincide with the central axis of lifting screws 75. The containers are provided on their under surfaces with four projections 77, so located as to fit into the sockets 76 of another container C, when stored one on top of the other, as in Figures 1 and 3. Relative motion in a horizontal plane is thereby prevented between stacked containers in the hold of the ship.

Referring to Figures 10 and 11, the sockets 76 are shown to consist of a lower portion 78 having cut therein a screw thread 79 of such proportions as to admit and provide secure engagement with lifting screws 75, and an upper portion 79 of larger diameter than said portion 78, into which a projection 77 is adapted to fit snugly when one container is stacked on another.

The operation of loading is accomplished in the following manner. The boom structure 10 is first located to the desired position relative to the pier P by means of motors 29 and 32 as heretofore described. Then cargo lifting mechanism 16 is lowered into position, with reference to a particular container C, by tilting the boom structure 10 by means of motor 33. Lifting screws 75 are thus positioned over container sockets 76. Motor 65 is started in proper direction to bring said lifting screws 75 into the threaded portions 78 of sockets 76. Then by tilting back boom structure 10 and re-locating said boom structure relative to the ship, the cargo container can be brought to the proper position with reference to the hold. The container can then be lowered into the hold. Throughout this operation, counterbalancing is effected by means of counterweights 18 through their controlling unit 17 as previously described. Reversing the motor 65 disengages cargo lifter 16 from the container, and the entire operation is repeated until the ship is loaded. The ship may be unloaded by merely reversing the procedure.

It will be readily understood that the operator may be positioned wherever most convenient, and that with little practice the operator can learn to manipulate the boom structure and the hoisting apparatus so as to clear the various structural parts of the ship and apparatus.

By means of the described apparatus, it is possible to carry out the loading and unloading operations simultaneously, thereby saving a great deal of time. By referring to Figure 3, it will be seen that by first removing containers C1, C2, C3 and C4, C5 can be removed and a full container substituted therefor. From then on, empty containers on removal can be replaced with full ones until the complete exchange of containers has taken place.

It will be understood that means (not shown) may be provided to stabilize the ship during the loading and unloading operation.

The foregoing description has been given by way of illustration only of the invention, and it has been made full and detailed for clearness of illustration.

I claim:

In combination with the hull of a ship, constituting a cargo hold, a track mounted on each side of the hold, means to raise and lower said tracks at will, a frame mounted on said track for movement fore and aft, a boom structure mounted on said frame for movement athwartships, said boom structure comprising two pivotally mounted side members, a portion of each side member toward one end being telescopic, and counterweights carried by the telescopic ends of said side members.

NORMAN E. DORLAND.

References Cited in the file of this patent

UNITED STATES PATENTS

| Number | Name | Date |
|---|---|---|
| 685,591 | Fernez et al. | Oct. 29, 1901 |
| 742,044 | Low | Oct. 20, 1903 |
| 833,058 | Kidd | Oct. 9, 1906 |
| 1,093,656 | Sidwell | Apr. 21, 1914 |
| 1,163,553 | Packer | Dec. 7, 1915 |
| 1,509,000 | Simpson | Sept. 16, 1924 |
| 1,584,442 | Every | May 11, 1926 |
| 2,177,525 | Henderson | Oct. 24, 1939 |
| 2,218,706 | Fitch et al. | Oct. 22, 1940 |
| 2,309,715 | Rudow | Feb. 2, 1943 |
| 2,363,797 | Lovfald | Nov. 28, 1944 |
| 2,405,893 | Leftwich | Aug. 13, 1946 |
| 2,456,104 | Andersen | Dec. 14, 1948 |
| 2,490,609 | Andersen | Dec. 6, 1949 |

FOREIGN PATENTS

| Number | Country | Date |
|---|---|---|
| 267,849 | Germany | Dec. 1, 1913 |
| 158,323 | Great Britain | Jan. 31, 1921 |
| 391,777 | Great Britain | Apr. 26, 1933 |